(12) United States Patent
Saint Martin et al.

(10) Patent No.: US 8,893,914 B2
(45) Date of Patent: Nov. 25, 2014

(54) TEMPORARY SEALED DOUBLE-DOOR JUNCTION DEVICE

(75) Inventors: Bernard Saint Martin, Boulogne (FR); Claude Imbert, La Tronche (FR)

(73) Assignee: Lourd 'Innov SAS, Lourdes (FR)

( * ) Notice: Subject to any disclaimer, the term of this patent is extended or adjusted under 35 U.S.C. 154(b) by 165 days.

(21) Appl. No.: 13/392,201

(22) PCT Filed: Aug. 25, 2010

(86) PCT No.: PCT/FR2010/051775
§ 371 (c)(1),
(2), (4) Date: Feb. 24, 2012

(87) PCT Pub. No.: WO2011/023906
PCT Pub. Date: Mar. 3, 2011

(65) Prior Publication Data
US 2012/0145715 A1 Jun. 14, 2012

(30) Foreign Application Priority Data
Aug. 26, 2009 (FR) ...................................... 09 55825

(51) Int. Cl.
*F16J 13/08* (2006.01)
*G21F 7/005* (2006.01)
*F16J 13/18* (2006.01)

(52) U.S. Cl.
CPC ................. *G21F 7/005* (2013.01); *F16J 13/08* (2013.01); *F16J 13/18* (2013.01)
USPC ........... 220/323; 220/324; 220/826; 220/833; 49/366; 49/493.1

(58) Field of Classification Search
CPC ........ B65D 43/14; B65D 43/22; B65D 45/00; B65D 45/16; E06B 3/70; E06B 7/16; G21F 7/005; F16J 13/08; F16J 13/18
USPC .......... 220/323, 324, 826, 833; 49/366, 493.1
See application file for complete search history.

(56) References Cited

U.S. PATENT DOCUMENTS

| 4,643,328 | A | 2/1987 | Lorenzelli et al. |
| 5,853,207 | A | 12/1998 | Saint Martin |

FOREIGN PATENT DOCUMENTS

| EP | 0688020 | 12/1995 |
| EP | 2 091 051 | 8/2009 |
| FR | 2 573 909 | 5/1986 |
| FR | 2 613 526 | 10/1988 |
| GB | 2 218 663 | 11/1989 |

OTHER PUBLICATIONS

International Search Report dated Jan. 17, 2011, corresponding to PCT/FR2010/051775.

*Primary Examiner* — Elizabeth Volz
(74) *Attorney, Agent, or Firm* — Young & Thompson

(57) ABSTRACT

A temporary sealed double-door junction device, for temporarily communicating a controlled-environment chamber with a controlled-environment removable container having a flexible wall, includes a female flange normally blocked by a female door, forming an assembly for the chamber, and a male flange normally blocked by a male door, forming an assembly for the container, wherein the male flange is to be sealingly coupled to the female flange, and the male door is to be sealingly coupled to the female door and to pass through the female flange. A shaft passes through the male door at a central portion thereof, wherein, on the side of the surface to be joined with the female door, an impeller having at least two blades is mounted by rigid attachment onto the shaft, and on the side of the opposite surface, a crank having at least two arms is mounted by rigid attachment onto the shaft.

18 Claims, 6 Drawing Sheets

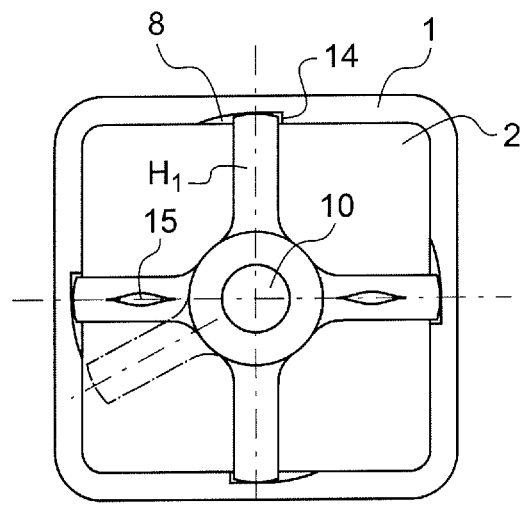
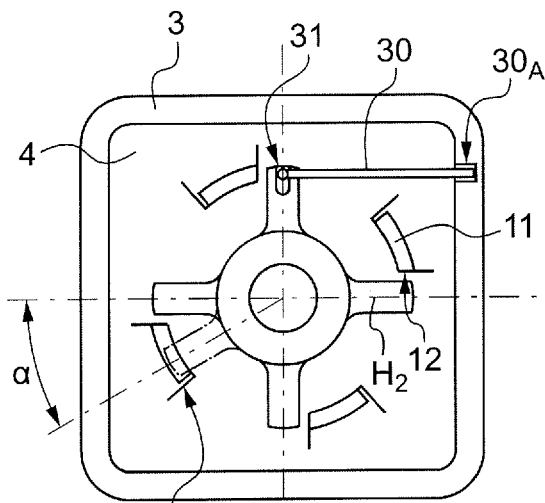
Fig. 5    Fig. 4
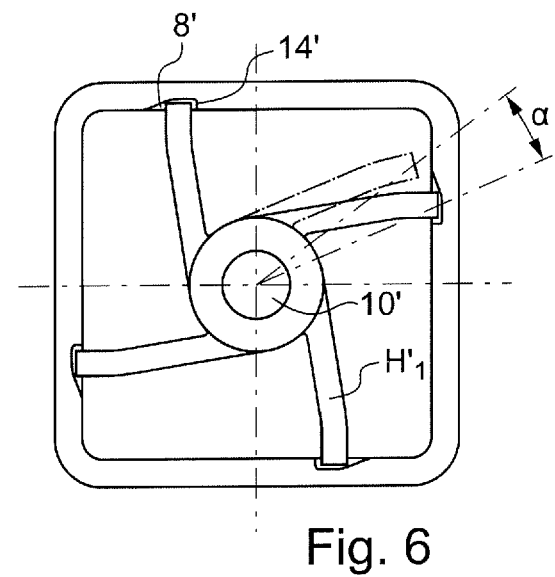
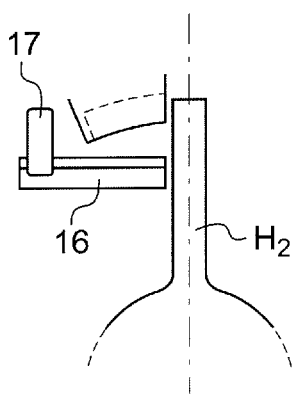
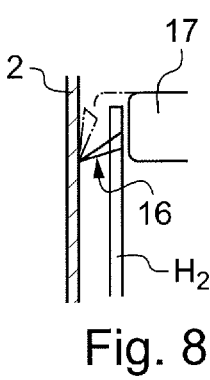
Fig. 6    Fig. 7    Fig. 8

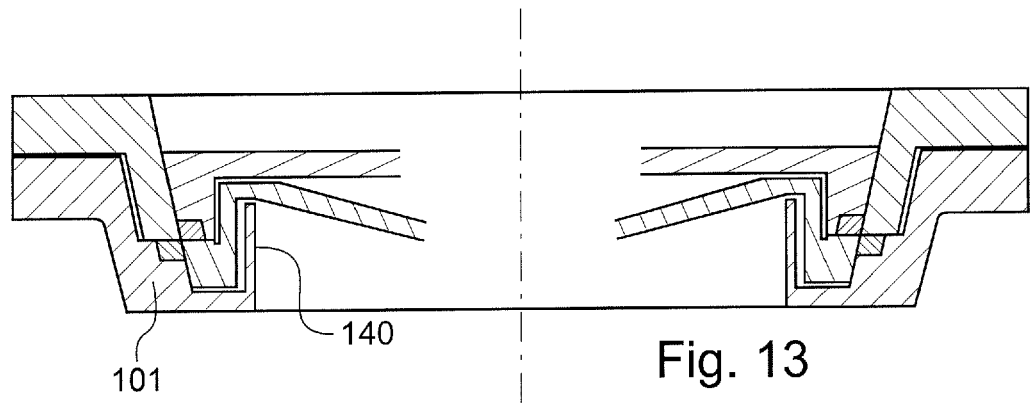
Fig. 13
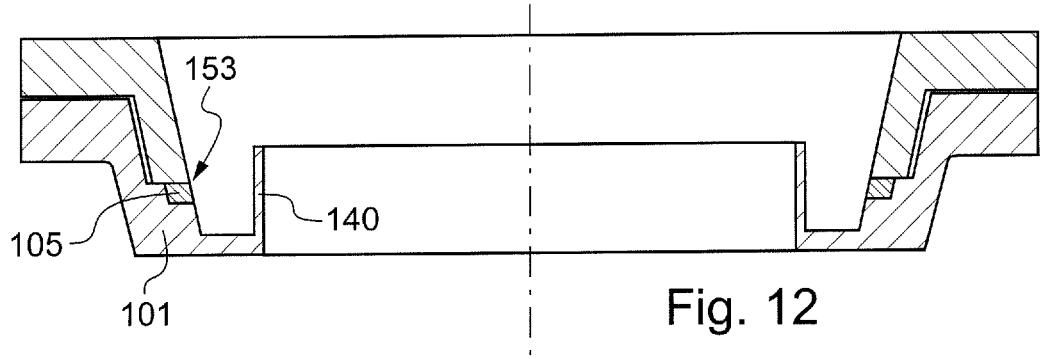
Fig. 12
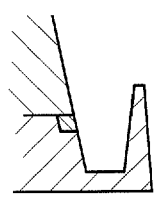
Fig. 14
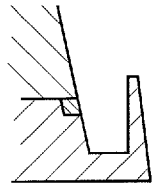

TEMPORARY SEALED DOUBLE-DOOR JUNCTION DEVICE

FIELD OF THE INVENTION

The invention relates to a temporary sealed double-door junction device for temporarily connecting a controlled-environment enclosure to a removable container that itself also constitutes a controlled environment, with a view to the transfer of products from one of these elements to the other under protection from cross-contamination (i.e. the products, whether contaminants, toxic products or conversely, sterile, must be protected from all outside contamination, while the surroundings must also be protected from all contamination by the products). These products can be consumables, active agents, tooling elements or others.

In practice, the controlled-environment (or controlled-atmosphere) enclosure or container is isolated with respect to the outside, usually in a sealed manner.

DESCRIPTION OF THE PRIOR ART

A sealed junction device between two enclosures that are isolated from the surroundings is already known from document EP 0688020 (or U.S. Pat. No. 5,853,207), as well as a single-use enclosure capable of implementation in such a device.

Such a sealed junction device comprises, in general terms, a flange firmly fixed to the enclosure and closed by a mobile door, as well as a flange that is firmly fixed to the mobile container and also closed by a mobile door. These doors are normally closed in a sealed manner but, when the two flanges on the one hand and the two doors on the other hand are placed next to each other, a movement of the entire two-door unit constituted in this way is possible, in order to connect the inside of the removable container and the inside of the enclosure, in order to allow products to be inserted or removed.

Since the movement of the door unit takes place, in practice, towards the inside of the enclosure, i.e. the door of the container passes through the flange of the enclosure, the assembly of the female flange and the female door connected to the enclosure is conventionally called the "female assembly", and the assembly of the male flange and the male door connected to the container and capable of being connected to said female assembly is called the "male assembly".

The movement of the unit formed by the two doors is controlled and guided in any manner whatever that is capable of allowing this unit to be released from the connecting space defined by the flanges, then returned when the user wishes to close the two doors.

It is important to note that the outer surfaces of the flanges and of the doors are exposed to the external environment while the container is not connected to the enclosure, but that said outer surfaces, which face each other when one flange is fixed to the other, must be applied against each other in a sealed manner so as to isolate the surfaces in relation to the inner space of the enclosure and the container.

It is understood that, providing no container is fixed against the enclosure, the door blocking off access to the enclosure, as well as the door blocking off access to the inside of the container, must remain closed in a sealed manner. To this end, a gasket situated between the door and the flange of each male and female assembly makes it possible, by its inner surface, to obtain this sealing right up to the level of the end line of the door (i.e. the sealing line between both doors and flanges). When the connection is made (which means that the flanges are placed next to each other, face against face), the flat outer surfaces of the gaskets provide sealing, flange-to-flange on the one hand, and door-to-door, on the other hand, up to the level of the end lines of the doors and the flanges. It is understood that a surface, comparable to a line, situated at the intersection of these gasket surfaces, will still remain indefinite and constitutes what is commonly called a "critical line". When the connection of the containers is desired, the flanges must be placed next to each other and locked, while the doors, initially locked onto the flanges, must be released, then pass through the female flange. The laws of mechanical tolerance require that the dimensions of the male door must be very slightly smaller than (optionally very close to), the dimensions of the female flange, thus increasing the "thickness" of the critical line. This currently involves complex mechanisms ensuring, among others, that the doors cannot be opened unless, and providing that, the flanges are placed next to each other and locked together. Many other restrictive conditions are necessary for the correct operation of the system. The more the doors contain complicated mechanisms, the more fragile are such systems and the greater the risks of malfunction or lack of security. Moreover, the more they comprise complex systems, the more costly and expensive they are; this can constitute a hindrance to the installation of such enclosures and such containers; in particular, the cost of the doors of removable containers intended for such sealed connection to an enclosure can dissuade a person skilled in the art from adopting the principle of single use for such containers in order to remove any risk of contamination of the contents of the container by a product transported during a previous use.

SUMMARY OF THE INVENTION

The purpose of the invention is to overcome at least some of the above-mentioned drawbacks and to this end it proposes a temporary sealed double-door junction device, for temporarily connecting a controlled-environment enclosure to a flexible-walled controlled-environment removable container, comprising, on the one hand, a female flange normally blocked off by a female door, forming an assembly capable of blocking off an opening of such a enclosure and, on the other hand, a male flange normally blocked off by a male door, forming an assembly capable of blocking off an opening of such a flexible-walled removable container, said male flange being capable of being coupled in a sealed manner to the female flange, and said male door being capable of being coupled in a sealed manner to the female door and of passing through the female flange, characterized in that:

the male door intended to be fixed to a flexible-walled removable container is passed through in a central portion by a freely-rotatable shaft on which are mounted, firmly fixed to each other, on the side of the face intended to be placed next to the female door, an impeller having at least two blades and, on the side of the opposite face, a crank having at least two arms designed so as to be capable of being driven in rotation by action through a flexible wall of such a flexible-walled removable container, the female door comprises, below its face intended to be placed next to the male door, notches made in the thickness of said female door, capable of receiving blades of the impeller, during a rotation of the latter, thus securing the two doors together, the inner section of the male flange and the outer section of the male door have complementary outlines which have, relative to the shaft mounted rotatably in the central portion, distance variations such that the crank has at least one angular closed configuration in which the ends of at least some of its arms extend beyond the male door and rest on the male flange so as to secure said male door to said male flange, and an angular open configuration in which said ends are away from the male flange and allow the movement of the male door through the female flange.

It will thus be appreciated that while the principle of the double-door transfer system is accepted, the object of the invention is to simplify the design of the complementary flange+door portions of a sealed junction device of the above-mentioned type and to improve the level of quality assurance of the safety functions, particularly with regard to the cleanliness of the containers. To this end, it reduces the number of human interventions, which involve major contamination risks, required throughout the manufacturing process. In particular, the non-circular shape of the outer outline of the male door (and of the inner outline of the male flange) makes it possible to ensure very simply the sealed locking of the male door in the male flange, by simply pressing on the ends of the arms of the crank, the length of which is chosen as a function of this outline; moreover, the fact that the crank is held by the male door intended to be firmly fixed to a flexible-walled removable container, which goes against a certain number of prejudices of persons skilled in the art, allows said crank to be operated while taking advantage of the flexibility of this flexible wall without the need to provide lateral control elements or control elements requiring access to the inside of the enclosure. And yet the assembly of the shaft, the impeller and the crank firmly fixed together is an assembly that can be obtained at low cost; the invention, while reducing the cost, therefore contributes to promoting the use of single-use removable containers under optimum operational safety conditions on connection. Secondarily, the invention makes it possible to reduce the risk of contamination during the insertion of products into, or their removal from, the enclosure.

It is understood that the crank is designed so that it can be driven in rotation by acting through the flexible wall of the removable container, in such a way as to allow the rotation of said crank to be controlled from the outside of the enclosure and said removable container.

A device thus defined can seem to have similarities with the object of document FR-2 613 526 (Euritech), which also discloses a door provided with a rotating assembly formed by a shaft to which are firmly fixed on one side, a handwheel (similar to the crank of the present invention) and on the other side, a claw assembly, but this assembly is held by the female door of the enclosure; thus the handwheel is on the side of the door facing the inside of the enclosure and does not need to pass through the female flange; however it can therefore only be operated from inside of said enclosure, and uses complex means of locking the female door in the female flange. The device of the invention is distinguished therefrom in particular by the fact that the rotating assembly is mounted on the male door, capable of being firmly attached to a flexible-walled removable container (while this document appears to envisage only stiff-walled containers), which makes it possible, by departing from the usually circular shape of the door and flanges, to give said rotating assembly and said male door and said male flange a structure that is simple in structure and implementation and is therefore inexpensive, without involving access via the inside of the enclosure, while allowing the various safety functions to be performed in a simple manner.

According to advantageous features of the invention, optionally combined:
- the complementary outlines of the male door and of the male flange have a substantially polygonal shape, advantageously rectangular (with optionally rounded corners), or even substantially square,
- the male flange comprises, below its face opposite the one that must abut against the female flange, recesses intended to receive the ends of the arms of the crank in said angular closed configuration. The recesses end in stops capable of delimiting the angular displacement of the arm in the closed configuration of the crank. The stops can be situated on the male door, on its face opposite the one that must abut against the female door,
- the male door comprises, on its face intended to abut with the female door, a retractable stop capable of preventing the rotation of the impeller or of the shaft starting from a configuration in which the crank is in its angular locking configuration in a direction allowing said crank to be unlocked, said stop being capable of being retracted by the female door being brought into abutment with the male door; until the stop is retracted, the crank remains locked in rotation and the male door cannot be separated from the male flange, i.e. the flexible-walled removable container is impregnable,
- the retractable stop is capable of being retracted, by pressure of a face situated on the female door, beyond the volume swept by the impeller during its rotation between its angular entry configuration into the notches and its angular configuration in which it axially couples the two doors,
- the impeller and the crank are mounted on the central shaft such that the crank is in its angular closed configuration when the blades of the impeller are facing the lead-in openings in the notches of the female door while the impeller is sufficiently engaged in the notches so as to axially couple the male and female doors when the crank is in its angular open configuration.

According to other advantageous characteristics, optionally combined with each other or the previous ones:
- the notches in the female door comprise, at their base, stops delimiting an angular coupling configuration for the impeller,
- the female door comprises at least one element for locking said female door to the female flange, the release of which vis-à-vis said female flange is controlled by the rotation of the impeller in the notches of said female door,
- said locking element is a rod slidably mounted in a channel a portion of which is contained in the female door and an end portion of which is contained in the female flange, having a locking configuration in which the rod extends in both portions and a release configuration in which it is entirely contained in the female door,
- a coupling element is provided to move the locking element according to the rotation of the impeller in the notches, the locking element being in a locking configuration of the female door with the female flange while the blades of the impeller are outside the notches, and being in a release configuration when the blades are at the end of their travel in the notches,
- the coupling element is advantageously a fork driven in rotation by the impeller and cooperating with an axially bent portion of the locking rod,
- the female door comprises a bolt capable of immobilizing the locking element in the locking configuration and preventing the latter from adopting the release configuration under the action of the impeller unless a male door abuts against said female door,
- the locking rod comprises a portion having a smaller cross-section cooperating with a head of the bolt that enters the channel at the site of the smaller cross-section in order to be able to immobilize it in position or conversely, allow it to slide in said channel.

Also advantageously, the female door is passed through by a key capable of being temporarily firmly fixed to the shaft of the male door so as to be able to control, at the due time, rotational movements of said shaft from the space situated facing the female door opposite the male door; said rotational movements can be manual or motorized.

Also advantageously, the male door comprises a hollow in which the impeller is situated, a detachable protective film being fixed onto a peripheral portion of the assembly formed from the male flange and the male door. It is understood that that such a detachable protective film provides protection against any contamination of the front face of the male door+ flange assembly held by the flexible-walled removable container and evidence of the integrity of said assembly (assembly that is new, undamaged and has not been used), up to the moment when it is removed, just before the container is connected to the enclosure by means of the junction device defined above; this is particularly useful in the case of a single-use removable container (by preventing any further use of a removable container that no longer has a protective film).

According to another advantageous feature of the invention, useful in itself, the male flange comprises along its inner edge situated opposite the female flange, a skirt extending just through the female flange; as a result, said skirt covers and protects the critical line; in other words, it prevents any contact of hands or objects transferred from the container to the enclosure, or vice versa, with potentially contaminated gaskets.

Preferably, said skirt has a cylindrical or frustoconical cross-section.

Advantageously, the flanges comprise complementary elements for positioning and temporary coupling.

The invention also relates to an assembly comprising an enclosure, an opening of which is blocked off by a female flange and a female door and at least one flexible-walled removable container comprising an opening blocked off by a male flange and a male door, said flanges and said doors forming a sealed junction device as defined above.

The invention also relates to a flexible-walled removable container comprising a male flange and a male door intended to form part of a sealed junction device of the aforementioned type.

LIST OF FIGURES

Objects, features and advantages of the invention will become apparent from the following description, given by way of illustration and non-limitatively, with reference to the attached drawings in which:

FIG. 4 is a front view of the flange/door assembly in FIG. 2, viewed from the left, when it is incorporated into the assembly in FIG. 3 (with a portion only of the impeller that forms part of the assembly in FIG. 1). A detail thereof shows the cooperation between a blade of the impeller and a locking element of the flange and of the door of said assembly in FIG. 2.

FIG. 5 is a front view of the flange/door assembly in FIG. 1, viewed from the left.

FIG. 6 is a variant of FIG. 5.

FIG. 7 is a detailed view of a variant of FIG. 4 showing a removable stop preventing the rotation of the impeller.

FIG. 8 is a cross-section view of the detail in FIG. 7,

FIG. 12 is a cross-sectional view of an assembly of male and female flanges provided with a critical line protector, without the corresponding doors.

FIG. 13 is a cross-sectional view of this assembly, with the doors in closed, locked configuration.

FIG. 14 is a detailed view of a critical line protector that is distinguished from the one in FIGS. 12 and 13 by its frusto-conical shape.

DETAILED DESCRIPTION

Figure 2:
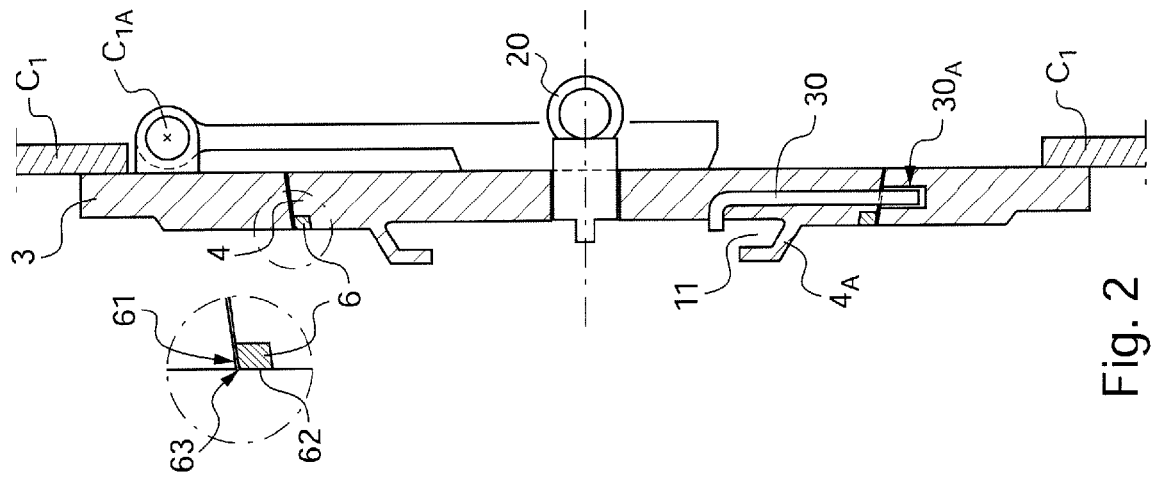
FIG. 2 is a cross-sectional view of another flange/door pair capable of blocking off in a sealed manner an opening of a controlled-atmosphere enclosure, for example a sterile enclosure. A detail thereof shows a gasket providing the sealing between the flange and the door of said assembly.
Figure 1:
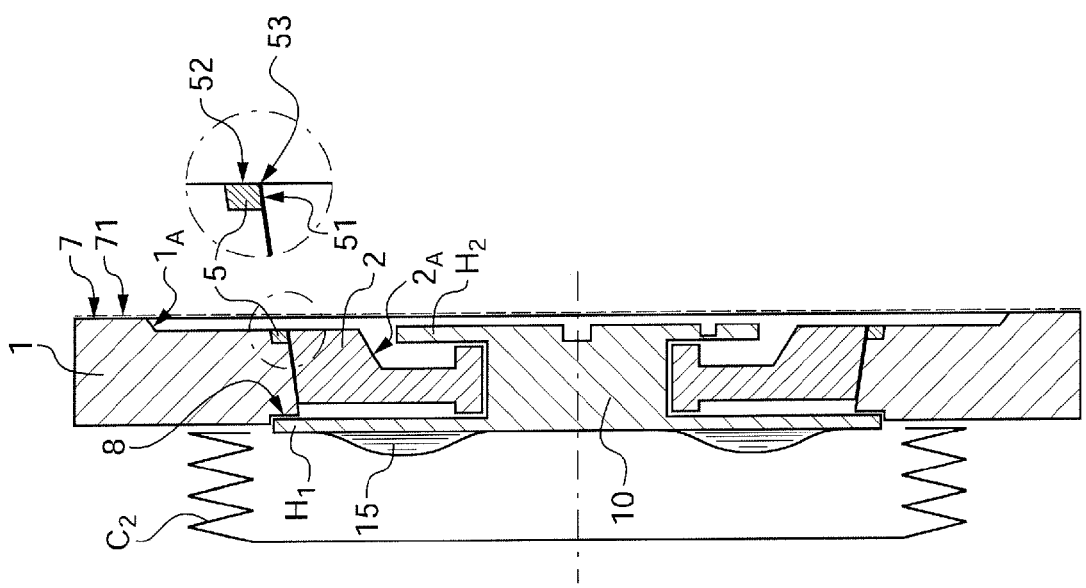
FIG. 1 is a cross-sectional view of a flange/door pair capable of blocking off in a sealed manner an opening of a controlled-atmosphere removable container, for example a single-use container. A detail thereof shows a gasket providing sealing between the flange and the door of said assembly.

FIGS. 1 and 2 show two flange/door pairs capable of cooperating according to the invention in order to provide a sealed temporary junction for connecting two enclosures each provided with one of the aforementioned flange/door pairs. Advantageously (this is of great practical importance), one of the enclosures is a stiff fixed enclosure, an opening of which, edged by a flange, is normally blocked off in a sealed manner by a first door, while the other enclosure is a removable container also comprising an opening edged by a flange that is normally blocked off by a second door. In other words, in the case in question, there is one flange/door pair constituting a fixed assembly, while the other flange/door pair forms a mobile assembly. The doors then open towards the inside of the fixed enclosure.

Figure 3:
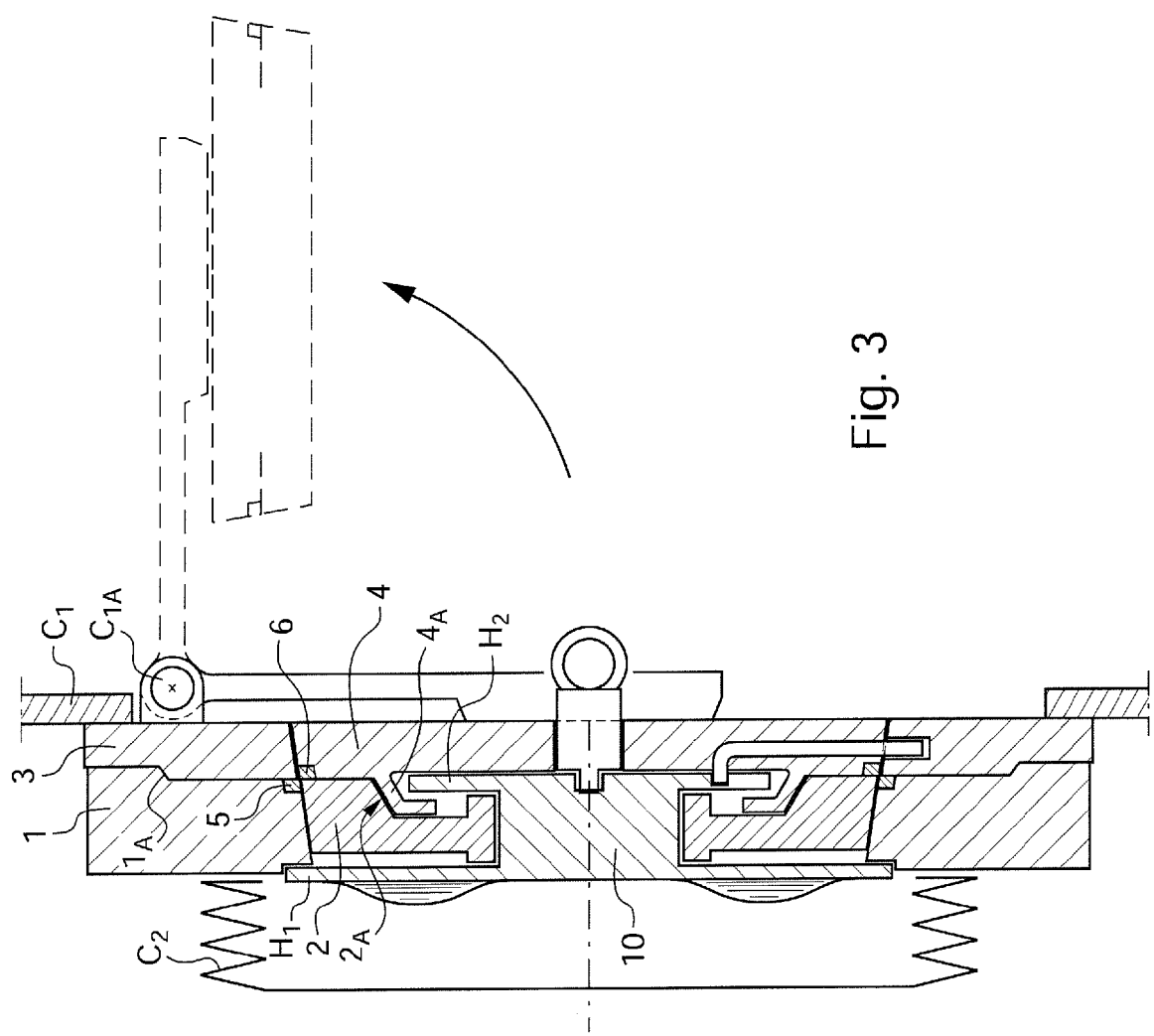
FIG. 3 is a cross-sectional view of the assembly of the pairs in FIGS. 1 and 2 after assembly, the door assembly being shown in solid lines when in closed configuration and in chain dot lines when it is in open configuration.

More particularly, FIG. 1 shows the mobile flange/door assembly, known as the "male assembly", while FIG. 2 shows the fixed flange/door assembly, known as the "female assembly". FIG. 3 shows said assemblies in assembled configuration.

The mobile assembly thus comprises a male flange 1 and a male door 2 blocking off said male flange, while the fixed assembly comprises a female flange 3 and a female door 4 blocking off said female flange.

In order to demonstrate visually that the female flange 3 is fixed, it is shown as being connected to a portion of the chamber wall shown diagrammatically with the reference C1, while, in order to demonstrate visually that the male flange is mobile, it is shown as being connected to a flexible wall in the form of a bellows, shown diagrammatically with the reference C2, defining a deformable chamber.

More particularly, the female assembly is capable of being fixed to a wall of a fixed enclosure while the male assembly is capable of being fixed to a flexible-walled removable container.

In order to facilitate the release of each door away from its flange, the complementary edges of the door and of the flange are flared in the direction of the area towards which the door can be released. Accordingly, since the inside of the fixed enclosure is on the right of the fixed assembly in FIG. 2, the edges of the doors and the flanges are flared to the right. Specifically, as necessary, the actual angle can be less than, equal to or greater than the angle shown.

Moreover, since it must be possible to release the door of the mobile assembly in FIG. 1 towards the right, through the flange of the fixed assembly, this male door 2 must be smaller, even if only slightly, than the female door 4.

A sealing gasket 5, in practice made of flexible elastomer, here fixed onto the male flange 1, provides, via its frustoconical surface 51, the sealing between said flange and its door 2. Similarly, a gasket 6, here fixed to the female door 4, provides, via its frustoconical surface 61, the sealing between the female flange 3 and its door 4. During the securing of the two assemblies, male and female, the sealing between the male flange and the female flange is provided by the flat face 52 of the gasket 5 while the sealing between the male door and the female door is provided by the flat face 62 of the gasket 6. This explains why the unit constituted by the doors constitutes a sealed unit.

It will be recalled that the intersections of the surfaces 51 and 52 of the gasket 5 and of the surfaces 61 and 62 of the gasket 6 constitute "critical lines" 53 and 63 likely to be exposed to contamination (the manufacturing tolerances of the different elements do not allow for sealed encapsulation of these geometrically ill-defined areas).

The sealed unit constituted by the doors 2 and 4 on opening is, in a known manner, either gripped manually and removed from its seat (which assumes the ability to act via the inside of the fixed enclosure), or released by rotation about a hinge C1A fixed to the inside of the enclosure on the female flange 3 (see FIG. 3).

As described in more detail below, the flange+door assemblies in FIGS. 1 to 3 have a design that makes it possible to simplify the structure of the complementary parts by which the flanges and doors cooperate, while guaranteeing a high level of quality assurance, as well as minimizing human involvement in operation, while reducing the risks of contamination during the removal or insertion of products to, or from, the fixed enclosure.

According to a first characteristic of the invention, the male door 2 capable of being (intended to be) fixed to a flexible-walled removable container is passed through, in a central portion, by a shaft 10 on which are mounted, on the side intended to be opposite the female door (capable of being— intended to be—held by the enclosure), a crank H1 (preferably having at least two arms) intended to lock the male door on its flange in a sealed manner and, on the side intended to abut against the female door, an impeller H2 having at least two blades. The shaft 10 is freely rotating and axially indexed in its seat in the door 2. It should be specified here that, as the blades of the impeller H2 are not intended to provide movement through the air, their geometry can be any whatever, providing that they form projections transverse to the shaft (the blades can therefore be simple arms). Conversely, the crank is designed to be capable of being manually driven in rotation, through the film constituting the flexible part of the removable container, therefore from the outside of the enclosure and the removable container; said action can be carried out on the arms of the crank. The inner section of the male flange (1) and the outer section of the male door (2) have complementary outlines that have, relative to the shaft (10) located in the central portion, distance variations such that the crank has at least one angular closed configuration in which the ends of at least some of its arms extend beyond the door and rest on the flange so as to secure said male door to the male flange, and an angular open configuration in which said ends are away from the flange and allow the movement of the male door through the female flange.

It is understood that the invention consisting, on the removable container, of locking the male door on its flange by means of this crank being capable of being driven in rotation from the outside, in combination with the fact that this shaft passing through this male door holds, firmly fixed to said shaft and therefore the crank, an impeller providing the axial coupling of the two doors makes possible, very simply, all the functions of connecting and placing in temporary communication a flexible-walled removable container on a fixed enclosure with protection against cross-contamination and full operational safety. Surprisingly, the simplicity with which all its functions are possible is such that the design of the assembly of the male door and its flange and of the rotating assembly is sufficiently simple that said assembly has only a moderate cost to the extent that it is compatible with a single use of the flexible-walled removable container; in fact, most of the advantageous elements making it possible to provide the various functions can be located on the female flange or on the female door, without detracting from the simplicity of the male assembly of the flexible-walled removable container. However, persons skilled in the art have had a tendency a priori to locate the maximum number of mobile elements on the door+flange assembly, which can be reused numerous times, held by the fixed enclosure.

The impeller H2 is advantageously arranged in a hollow portion 2A of the male door. As is apparent from FIG. 1, this male door is itself situated in a hollow portion 1A of the male flange, edged by a peripheral collar 7; this makes it possible, by temporary closure of this hollow portion of the male door (or even of the hollow portion of the male flange) here, by a film 71, made of plastic or other material, bonded or welded to this collar while remaining detachable, to isolate the hollow outer surface of the male door and the impeller, and preferably that of the male flange, and to protect them from any contamination up to the moment of connection for use.

Sealing gaskets (not shown) are arranged between the door 2 and the shaft 10 in such a way as to maintain the seal between the two sides of this male door.

According to a second feature of the invention, complementary to the first, the female door 4 comprises (see FIG. 4 in addition to FIG. 2), on the side intended to abut against the male door, notches 11 made in its thickness, capable of receiving, through lateral lead-in openings 12, the blades of the impeller H2 when the two doors abut against each other, then to allow an angular displacement of the blades inside said notches, about the axis of the shaft 10, to at least one configuration in which, jointly with the notches, the blades provide the axial coupling of the two doors. In this configuration, the gasket 6 provides the sealing between the two doors, trapping the two unprotected surfaces in a sealed manner.

In fact, it is apparent from FIG. 2 that the female door 4 comprises, on the side intended to abut against the male door, a frustoconical tab 4A defining a central extra thickness of the door 4; this extra thickness is complementary to the hollow 2A arranged in the door to receive the impeller H2 (see above); this frustoconical tab can have a discontinuous circumference, being formed by the walls delimiting the notches 11. Of course, in a variant, the door 2 can have a constant thickness with respect to which the impeller projects, while the notches are fully within the constant thickness of the door 4. It is understood however that the structure shown in FIGS. 1 and 2 has an advantage, as previously described, from the point of view of the protection of the outer surfaces and the impeller H2, before a step of securing a single-use mobile container to a female door such as the door 4. It is noteworthy that one of the blades here has the form of a fork 31, the utility of which will become apparent below.

The cooperation of the flanges and the doors is shown in FIG. 3, where it is apparent that the flanges 1 and 3 abut against each other, while the doors 2 and 4 are placed next to each other, the blades of the impeller H2 of the male door being engaged in the notches 11 in order to provide the coupling of the male and female doors (in FIG. 4, the blades of the impeller H2 circumferentially face the openings 12 of the notches without yet being engaged therein; said FIG. 4 also shows, in broken lines, one of the blades, after rotation by an angle α, fully engaged in the corresponding notch, against the corresponding stop 13).

It is easily understood that, in order to carry out said abutment and securing actions correctly, the male mobile assembly must be placed next to the female receiving assembly in a position that is fully defined by appropriate centring and locating systems implemented by external means of securing the flanges together. These means, which are known per se, are not shown in FIGS. 1 to 4. The rectangular or square shape (see below) of the assemblies greatly facilitates this positioning.

As stated above, in order to facilitate the flow or transfer of the items through the temporary sealed double-door junction device, the passage section, and therefore the outline of the line of the gaskets 5 and 6, the doors and the flanges has a shape that departs from a circle centred on the axis of the shaft 10, for example oval or polygonal (with corners that are rounded or not).

In the example shown herein, the outline of the male door has a rectangular shape, here almost square.

One benefit of such a non-circular shape that has rectilinear portions is apparent from FIGS. 5 and 6 which show the inner surface of the male flange-door assembly, i.e. the surface facing the inside of the flexible mobile container C1, according to two possible example configurations.

FIG. 5 shows the inner face of the flange-door assembly in FIG. 1 in a configuration in which the door and the male flange should not be separated, typically when said assembly is not fixed to any female assembly such as that in FIG. 2. It is noted that the flange 1 comprises a plurality of recesses 8 situated along its inner outline, in at least approximately median areas of the rectilinear portions of said outline. With respect to the crank H1, it has arms with a length less than the distance to the axis from the corners of the inner outline of said flange, but greater than the distance to the axis from said at least approximately median areas. The result is that when the arms, which are advantageously equal in number to the number of corners of the inner outline of the male flange, therefore here four in number since the outline is at least approximately square, are oriented towards the corners, they do not obstruct any possible movement of the male door through the male flange; conversely, when the arms are oriented towards the above-mentioned median areas, their ends extend beyond the inner outline of the flange and enter the respective recesses 8, then preventing any movement of the male door outside the male flange; the recesses then lock the male door in the male flange. In the example in FIG. 5, the arms are radial. In the variant in FIG. 6, in which similar elements to those in FIG. 5 are denoted by similar reference numbers but given a prime mark, the arms are laterally offset relative to radial positions and the recesses 8' are offset in the direction of the corners of the outline.

The presence of the recesses 8 or 8' has the advantage of defining stops 14 and 14', the benefit of which is mentioned below.

It is understood however that the immobilizing of the door in the flange in an angular configuration of the arms can be obtained without the need to provide such recesses, providing that the arms can run along the inner surface of the flange (therefore the surface situated inside the mobile flexible container).

It is noteworthy that the recesses 8 or 8' do not provide any obstruction to the flow of the items during transfer.

Also in a preferred manner, the flange-door assembly in FIG. 2 also comprises at least one locking element capable of keeping the female door 4 secured to the female flange 3 unless a male door is in abutment with said female door. In the embodiment shown by way of example, the locking element is shown diagrammatically in the form of a locking rod 30 slidably mounted in a transverse channel 30A situated within the thickness of the female flange-door assembly, partially in the door and partially in the flange, having a stroke such that the end of the rod 30 can enter, when desired, into the part of the channel situated in the flange, or exit from it completely. Even more preferably, the locking element is capable of being driven in synchronized movement with the impeller H2. To this end, the rod 30 is advantageously bent so as to have one end parallel to the axis of the impeller and capable of coming between the teeth of a fork held by the impeller. More precisely, in the example shown in FIG. 4, it is one of the blades that is forked; in a variant, not shown, the fork is separate from the end of the blade by which it is held.

It is understood that in this way the female door of the fixed enclosure is normally locked onto the female flange and only unlocks provided that a male flange-door assembly of a flexible-walled removable container is coupled to the female flange-door assembly of this fixed enclosure and the impeller of the male assembly rotates until it both locks the doors together and acts on the rod 30 so as to extract it from the part of its channel that is situated in the female flange.

Thus a sequencing of the movements is achieved to prevent the opening of the female door until the connection has been made and the impeller placed in the configuration of locking the doors together (it is possible to choose not to authorize the opening of the female door until the impeller H2 is fully engaged in the notches, or only until the impeller has rotated through a significant fraction, for example 75%, of its possible rotation stroke. Also conversely, at the start of the rotation in the reverse direction the impeller automatically relocks the female door on its flange by means of the rod 30 before separating the doors.

There can of course be several unlocking elements of the female door relative to its flange.

It is noteworthy that, although the assembly of the rod 30 and its channel 30A are shown in FIG. 2 for reasons of legibility, they are not arranged in a direction passing the axis of rotation of the impeller.

In a variant, the rod 30 can be driven by a fork that is independent of the blades of the impeller H2; thus this drive can be provided by a fork linked (in the manner of a transverse bolt) to an optional key 20, normally held permanently by the female door and capable of being coupled by its threaded, square, screwdriver, bayonet or other end to the impeller H2 (this optional key can also have other functions, as stated below).

One of the advantages of providing that the crank-impeller assembly is held by the male door of the flexible-walled removable container is that the crank allows an operator to act on it through the flexible film constituting the flexible wall of this removable container in order to carry out the rotations.

It is understood that the assembly of the crank and the impeller is designed and mounted such that:

- in the starting position, the crank H1 is immobilized in the flange 1, the male door and the male flange are then locked in the closed and sealed position.
- when the two doors 2 and 4 are placed next to each other, H2 is then opposite the lead-ins to the notches 11 in the door 4, without yet coupling the doors together,
- when rotated, H2 enters the notches 11 in the female door 4 and securely locks the two doors onto each other.
- in parallel, after an initial rotation of the impeller H2 sufficient to lock the two doors to each other, H1 comes out of the recesses 8 in the flange 1, unlocking the door 2 with respect to its flange 1.
- finally, if the female assembly is equipped therewith, the latch 30 for locking the door 4 onto its flange 3 is displaced until unlocking is obtained at the end of travel of the impeller H2.

On return, during disconnection, the reverse cycle is carried out by rotating the crank H1 in the opposite direction:

- pushing in the latch 30 until the female door 4 is locked on its flange 3,
- re-locking the door 2 on its flange 1, by cooperation of the arms of H1 with the recesses 8, then unlocking the doors 2 and 4 from each other (the blades come out of the notches).

It is noteworthy that after partial rotation of the crank and the impeller, the door 2 is already or still locked on its flange 1 while the two doors remain or are already secured; in other words, the door 2 is locked on its flange before the two doors can be separated.

Thus the concept known as "positive security" is assured: a container cannot be disconnected from the enclosure while the male (or female) door is open, and until the door unit is closed and locked.

The rotation of the crank and the impeller to carry out the locking/unlocking operations as described above, is obtained:

- either by a manual action by the operator, optionally using a tool, directly through the film of the container on the crank H1 (to this end, the latter advantageously comprises lugs 15 or any other form of projecting or recessed bosses, allowing the fingers of the operator or of the tool adopting these shapes to actuate it according to the operations to be carried out,
- or by means of a key 20 (see above, in particular with respect to FIG. 1), which during the abutment of the flanges, is indexed onto the crank H2. This key, advantageously integrated into the door 4, can be turned manually by an operator from inside the protected area (when he moves around inside the fixed enclosure, for example.) or be remotely actuated by a mechanical linkage,
- or also, without further manual intervention by an operator, via an actuator (electric motor, electromechanical, electromagnetic, pneumatic assembly, etc.) acting directly on the impeller when the latter is indexed thereon during the docking of the male assembly onto the female assembly. In the latter case, the activation can be by electrical remote control, manual, or generated by an electronic automatic control device. The motor will advantageously be embedded in the thickness of the female door 4, outside the protected area or in a sealed housing placed next to this same door inside the protected area.

As stated above, the notches 11 in the female door 4, as well as the recesses 8 in the male door, advantageously comprise stops 13 (notches 11) or 14 or 14' (with respect to the recesses 8; it is understood that these stops constitute a delimitation of the rotation of the crank-impeller assembly in the direction of locking of the doors to each other, which allows for effective sequencing. It is understood that this advantage is already obtained providing that some of the notches and/or recesses comprise stops; with respect to stops on the male door, it should be noted that the latter can be constituted by projections, in the absence of any recess.

FIG. 7 diagrammatically shows a variant in which, in addition to the notch 11 end stops, a retractable stopper 16 is provided on the male door 2 (on the side facing the female door) which immobilizes the impeller H2 in its normal position (corresponding to the locking by H2 of the door 2 on the male flange 1); the impeller-crank assembly is, in fact, wedged between the stops 14 (the stops in the recesses act on the crank) and the retractable stopper 16 (which prevents any movement of the impeller from starting). The retractable safety stopper 16 is here retracted, by crushing (see FIG. 8), by a boss 17 held by the female door, facing this stopper, outside the area swept by the blades of the impeller during its rotation between its extreme positions, when the mobile container is put in place opposite the female assembly mounted on the wall of the fixed enclosure.

The impeller H2 can only therefore be rotated when the container is correctly docked.

During disconnection, the impeller H2 returns to the starting point. At the moment the container is detached, the stopper 16 is released and returns to immobilize the impeller H2 in the "door 2 closed and locked on its flange 1" position. The integrity of the container is then assured before and after use.

It is understood that it is quite particularly advantageous that means are provided to ensure that the operation of the temporary sealed double-door junction device is dependent on a prior docking of the mobile male assembly on the female assembly fixed on the wall of the for example sterile enclosure. An example of this is shown in FIGS. 7 and 8.

Figure 9:
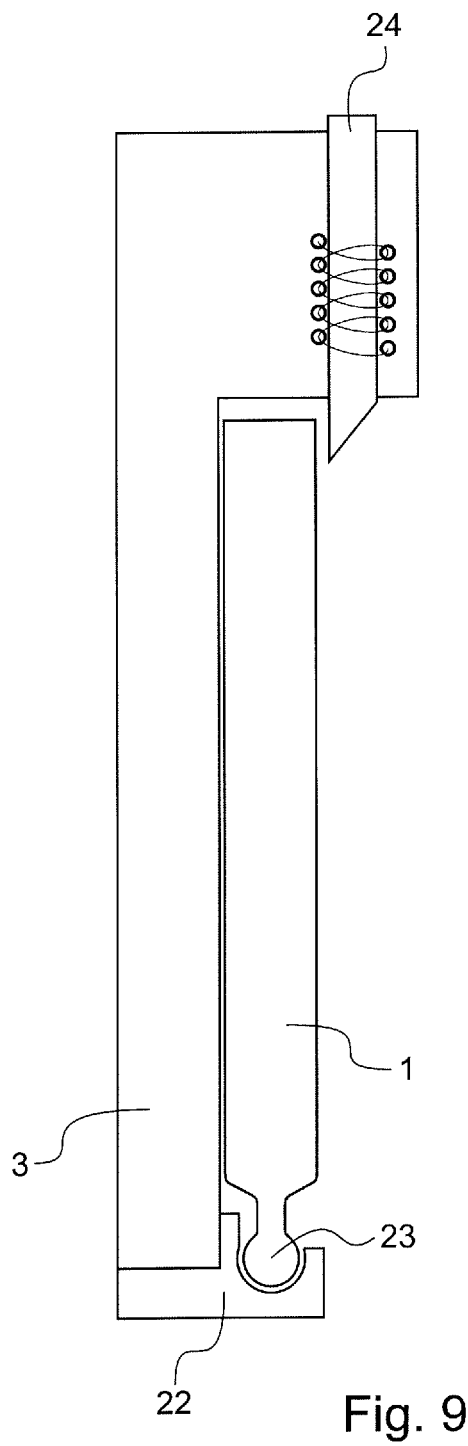
FIG. 9 is a partial cross-sectional view of the flanges in FIG. 3 provided with catches and bolts for securing these flanges together.

Another variant is shown in FIG. 9, in which it is apparent that the male 1 and female 3 flanges comprise complementary centring, accurate positioning, locating and locking means immobilizing them together. To this end, the female flange 3 comprises a series of fixed or mobile projections 22, arranged on its periphery projecting axially relative to its surface capable of abutting against the male flange 1, in order to act as locating pins and intended to receive complementary shapes or catches 23 arranged on the male flange, on its periphery so that it can be surrounded by the plurality of catches 23. The docking is carried out by putting the male assembly of the container in place on the female receptacle of the enclosure using translation movements parallel to the plane of abutment of the two flanges, combined with a pivoting about axes parallel or perpendicular to this plane of abutment.

When the docking is carried out, a bolt 24 is provided here to be actuated manually or automatically in order to firmly immobilize the connection of the two flanges.

Figure 10:
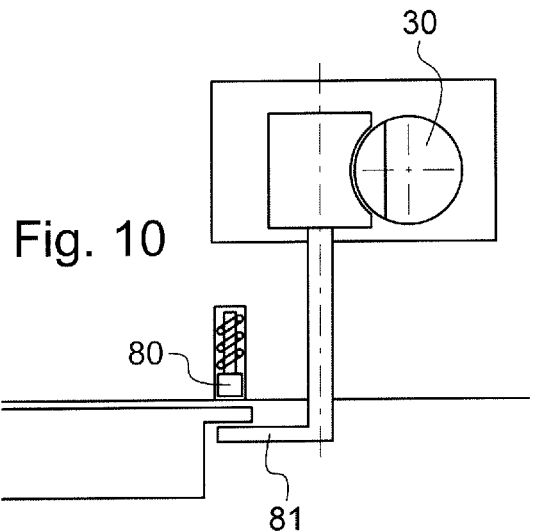
FIG. 10 is a diagrammatic elevation view of a safety device cooperating with a locking rod of the assembly in FIG. 2.
Figure 11:
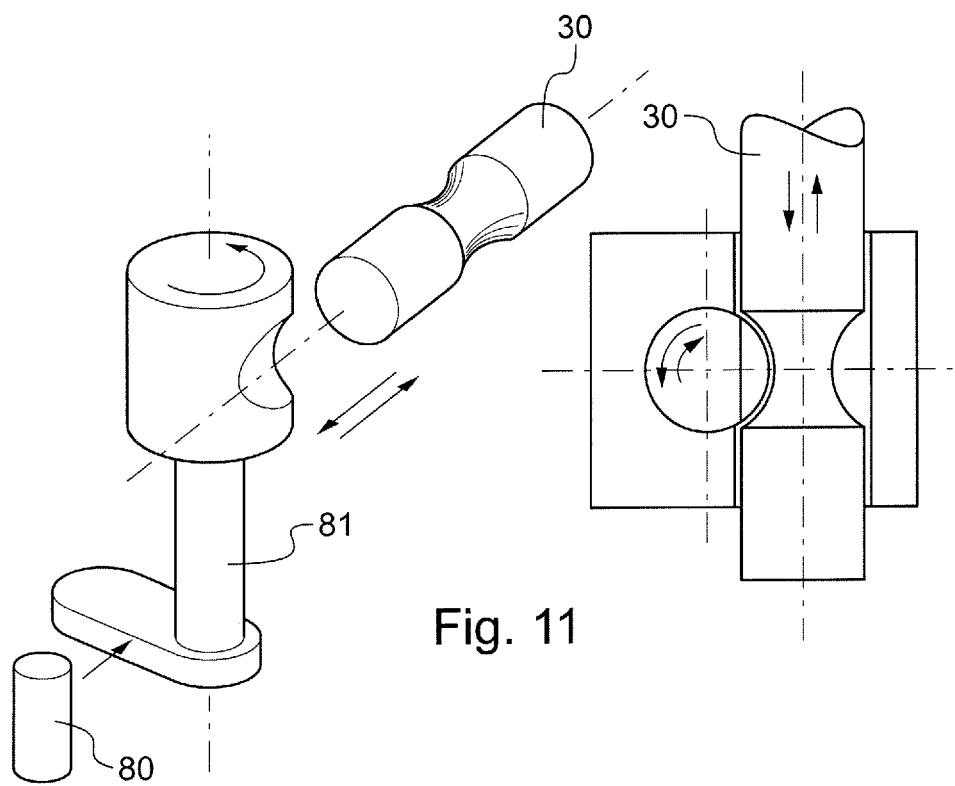
FIG. 11 is an exploded perspective view.

Yet a further variant is shown in FIGS. 10 and 11. It is easily understood that a flexibly retractable finger 80 that normally projects but is pushed back by the abutment of the two flanges can be provided on the female flange in order to prevent any movement of the locking rod 30 of the female assembly, while the container is not present in the connection position. In the configuration in FIG. 10, the finger 80 is kept retracted by the presence of a portion of the male flange 1. Beside this portion of the male flange is situated a bolt catch 81 comprising an axial rod holding a thick head provided with a transverse slot such that, when the bolt 81 is in the configuration shown, the slot is in the extension of the channel 30A in FIG. 2 or 4, while, when the bolt is pushed downwards by the finger 80, in the absence of a male flange, the thick portion of the head without a slot prevents any movement of the locking rod 30. To this end, the rod advantageously has a narrower section such that, when the rod is engaged in the channel in its normal locking configuration, the head of the bolt can be moved vertically between a top configuration (shown) where the rod is free to move and a bottom configuration in which the thick part enters the area of narrower section, and thus locks it in position in the channel 30A.

Thus, the bolt 81 is mechanically linked to the latch 30 for locking the female door 4 on its flange 3 in order to, on the one hand, prevent its opening while the bolt is not in the locked position and, on the other hand, prevent the bolt being returned to the unlocked position until the latch has returned to its door closed and locked position.

This function perpetuates the "no opening of the female door without a container connected" and, conversely, "no disconnection of the container until the female door 4 is closed and locked" safety feature. This is independent of the safety features already described previously.

The various safety features that have just been described can be combined or not as necessary (depending on the desired safety level).

According to yet a further advantageous characteristic of the invention, the double-door device is designed so that the critical line of the gasket 5 of the flanges, which constitutes an uncertainty regarding a potential risk—albeit very remote—of microbiological contamination by contact, at the moment the transferred items pass through, can be effectively protected—see FIGS. 12 and 13.

In the description of this variant, elements that are similar to those in the previous figures are denoted by similar references, but increased by the number 100.

To this end, the male flange 101 (see FIG. 12) comprises, connected to its base, a cylindrical skirt 140 edging the inner outline of this flange base, extending in an at least approximately axial manner either close to or beyond the critical line 153 of the gasket 105, thus preventing any contact of the items or tools passing through, or even the hands of an operator, with the critical line (this is clearly true when a product enters towards the enclosure, i.e. towards the right, but also proves effective for reverse movements).

More precisely, the peripheral portions of the male and female doors are shaped to engage together between the inner outlines of the male and female flanges and the cylindrical wall (see FIG. 13).

In FIGS. 12 and 13 the cylindrical skirt has a substantially constant thickness. In a variant (see FIG. 14) the wall forming the skirt is frustoconical; in fact multiple shapes are possible, with a symmetrical taper relative to a reference parallel to the axis, an inwardly-convergent taper or conversely a divergent taper. Such a taper makes it possible in practice to promote the flow of the items through the passage.

It is understood that the male door must have a profile compatible with this complex shape so that the previously-described sealing functions can be provided. Clearly, the same applies to the profile of the female door and its flange.

The combination of this function of protecting the critical line with that of protecting the front face of the male assembly by a peelable film is achieved by the general profile in FIG. 13. It also ensures the high quality and operational safety of the double-door temporary junction device that is the object of the invention.

It will be appreciated, with reference to the preferred embodiments mentioned above that:

the invention is applicable to flanges and doors of any shape whatever: oval, polygonal, rectangular with rounded corners or not, etc.

there can be a system for the protection of the critical line, preventing any contact of the products transferred with the potentially contaminated gasket.

the male door has mobile rotary locking and unlocking means constituted by crank arms and impeller blades that can lodge in notches or receptacles provided on the male flange and the female door.

the crank and the impeller, strictly fixed together, are mounted indexed on each side of the male door on a shaft that is axially fixed with a freedom of movement in rotation such that any movement of one drives a strictly identical movement of the other, the male flange and the female door include receptacles such that the blades of the impeller moved in a direction starting from the initial configuration (door 2 locked on flange 1) successively operate the locking of both doors (door 2 to door 4) then the unlocking of the male door with respect to its flange (door 2 with respect to its flange 1).

the sequencing is reversible (from this last position, the reverse movement of the impellers operates the locking of the door 2 on the flange 1 before unlocking the door 2 from the door 4), the notches, recesses or receptacles provided in the female door and/or in the female flange include stops limiting the rotation of the impellers to a strict minimum.

the rotation of the impellers (or cranks) is carried out by manual action, through the film of the container, on the impeller H1, optionally using a tool that follows the shape of the impeller. This rotation can also be achieved by the action of a key mounted passing through the female door on which the hub of the impeller H2 is indexed during the docking of the container door. The actuation of this key can be manual from the inside of the protected area, remotely controlled by means of a suitable linkage, or finally, motorized (electric motor, electromechanical, pneumatic or electromagnetic means, etc., advantageously embedded in the thickness of the female door or in a sealed housing placed next to the female door). In this case, activation is advantageously remotely controlled via a wired or wireless link, the female door comprises an immobilization lock on the female flange in the closed position. The latch is opened or unlocked by the end of the rotation of the impeller H2 after locking of the male door on the female door, then closed or immobilized again by the start of the return movement of the impeller ("no disconnection when the door is open" safety feature).

A flexible film 71 in FIG. 1 welded onto the front face 7 in FIG. 1 makes it possible to contain and protect the space from any contamination during the operations of transport, storage, etc., up to the moment of use of the container, preferably for a single use, the male door comprises a retractable stop immobilizing the arms of the crank H1 in the receptacles or recesses in the flange 1. Combined with the protective film on the front face of the mobile male assembly, it provides evidence of the integrity and the inviolability by accident of the container, this retractable stop, which is pushed back during the docking of the male mobile assembly on the female assembly by a protruding buffer on the female door, frees the rotation of the crank-impeller on connection and immobilizes it again on separation of the assemblies at the moment of disconnection, The male and female flanges comprise devices for quick docking and locking in the connection position. Simple cascading safety measures allow [correct] or prevent incorrect manipulations leading to situations of loss of containment of the enclosures and containers.

It can moreover be noted that:

Manufacturing the female door and the male flange by bi-injection makes it possible to mould the gaskets directly onto their support, thus eliminating the interstices that are the source of leakage, improving the sterilization conditions and increasing the sealing on straight lines, The flanges 1 and 3 can be equipped with electronic means, such as RFID chips (or others) for accurate traceability of the transfers.

It is understood that it is most particularly useful to combine the above-mentioned safety measures in a cascade, so as to maximize quality assurance:

Evidence of integrity of the container and protection of the front outer surface of the male door and its flange until it is used: by the film applied over the front face of the male assembly.

Maintaining the integrity and inviolability by accident of the container (the male door cannot be opened) until it is docked on the female assembly: by immobilizing the impeller between the stop in the recesses in the male flange and the retractable stop on the male door.

Maintaining the integrity of the closure of the female door (the female door cannot be opened) until a male container assembly has been completely connected: by the rotation of the impeller, which only unlocks the opening bolt at the end of travel, after having secured the 2 doors together and separated the male door from its male flange.

Sequencing, in the correct order by design, of the locking and unlocking operations on the male door/female door components, male door to male flange and unlocking the female door from its female flange and vice-versa: by the relative positioning of the notches in the female door and the recesses in the male flange on the one hand and of the crank and the impeller on the other hand and, finally, of the female door to female flange locking device.

Preventing unlocking the female door from its female flange until the bolt securing the flanges together during the docking of the container on the female assembly is in the locked position: by immobilizing the opening latch using the bolt on the flanges.

Preventing the movement of the bolt on the flanges when the container is not docked: by the pin, which can be pushed back by the docking of a container, immobilizing the bolt in the open position.

Preventing the disconnection of a container until the doors are closed and locked on their respective flange and the doors are separated from each other: by the latch, which only releases the bolt on the flanges in the female door locked to female flange position, and by the impeller, which must have been released from the notches in the female door.

Preventing the separation of the doors from each other when they are open: by the rotation of the impeller, which remains immobilized until the latch has locked the female door on its flange.

The invention claimed is:

1. A temporary seal double-door junction device, for temporarily connecting a controlled-environment enclosure to a controlled-environment flexible-walled removable container, comprising:
   a female flange normally blocked off by a female door, forming an assembly intended to block off an opening of such an enclosure; and
   a male flange normally blocked off by a male door, forming a assembly intended to block off an opening of such a flexible-walled removable container, the male flange being capable of being coupled in a sealed manner to the female flange, and the male door being capable of being coupled in a sealed manner to the female door and of passing through the female flange, wherein:
   the male door intended to be fixed to a flexible-walled removable container is passed through in a central portion by a freely-rotating shaft on which are mounted, firmly fixed to each other, a side of a face intended to be docked to the female door, an impeller having at least two blades and, on a side of an opposite face, a crank having at least two arms, designed so as to be capable of being driven in rotation by action through a flexible wall of such a flexible-walled removable container,
   the female door comprises, below a face of the female door intended to be docked against the male door, notches arranged in the thickness of said female door, capable of receiving blades of the impeller, during a rotation of the latter, thus securing the two doors together,
   an inner section of the male flange and an outer section of the male door have complementary outlines that have, relative to the shaft situated in the central portion, distance variations such that the crank has at least one angular closed configuration in which the ends of at least some of the arms extend beyond the door and rest on the flange so as to secure the male door to the male flange, and an angular open configuration in which said ends are away from the flange and allow the movement of the male door through the female flange.

2. The device according to claim 1, wherein the male flange comprises, below a face of the male flange face opposite to the one that must abut against the female flange, recesses intended to receive the ends of the arms of the crank in said angular closed configuration, and defining stops capable of delimiting the angular displacement of the arms in the closed configuration of the crank.

3. The device according to claim 1, wherein the male door comprises, on a face of the male flange intended to abut against the female door, a retractable stop capable of preventing the rotation of the impeller from a configuration in which the crank is in an angular locking configuration in a direction allowing for the unlocking of said crank, the stop being capable of being retracted by the arrival of the female door in abutment with the male door, by pressure of a face situated on said female door beyond a volume swept by the impeller during rotation between an angular entry configuration of the impeller into the notches and an angular configuration in which the impeller axially couples the two doors.

4. The device according to claim 1, wherein the impeller and the crank are mounted on the central shaft such that the crank is in the angular closed configuration of locking the male door on its flange when, during the abutment of the male and female assemblies, the blades of the impeller are facing the lead-in openings into the notches of the female door.

5. The device according to claim 1, wherein the notches comprise, at their base, stops delimiting for the impeller an angular coupling configuration.

6. The device according to claim 1, wherein the female door is passed through by a key capable of being temporarily secured to the shaft of the male door so that it can also control rotational movements of said shaft and therefore of the impeller and the crank, from the space situated facing the female door, opposite the male door.

7. The device according to claim 1, wherein the male door comprises a hollow in which the impeller is situated, a protective film being detachably fixed onto a peripheral portion of the assembly formed by the male flange and the male door.

8. The device according to claim 1, wherein the male flange comprises, along an inner edge of the male flange situated opposite the female flange, a skirt extending just through the female flange, thus protecting the critical line from any contact with products or tools transferred or also the hands of an operator.

9. The device according to claim 1, wherein the flanges comprise complementary positioning and temporary coupling elements.

10. An assembly comprising an enclosure, an opening of which is blocked off by the female flange and the female door and at least one of the flexible-walled removable container comprising the opening blocked off by the male flange and the male door, said flanges and said doors forming the temporary sealed junction device according to claim 1.

11. A flexible-walled removable container comprising a male flange and a male door intended to form part of a sealed temporary junction device according to claim 1.

12. The device according to claim 1, wherein the complementary outlines of the male door and the male flange and of the female door and the female flange have a substantially rectangular or substantially square shape.

13. The device according to claim 12, wherein the male flange comprises, below a face of the male flange face opposite to the one that must abut against the female flange, recesses intended to receive the ends of the arms of the crank in said angular closed configuration, and defining stops capable of delimiting the angular displacement of the arms in the closed configuration of the crank.

14. The device according to claim 1, wherein the female door comprises at least one element for locking said female door to the female flange, the release or re-engagement of which vis-à-vis said female flange is controlled by the rotation of the impeller in the notches of said female door.

15. The device according to claim 14, wherein a coupling element with the impeller is provided to move the locking element according to the rotation of the impeller in the notches, the locking element being in a locking configuration of the female door with the female flange while the blades of the impeller are outside the notches, and being in a release configuration when the blades are at the end of their travel in the notches.

16. The device according to claim 15, wherein the female flange comprises a bolt capable of immobilizing the locking element in the locking configuration and preventing the latter adopting the release configuration under the action of the impeller unless a male assembly is in abutment with and locked by said bolt to said female assembly.

17. The device according to claim 14, wherein the female flange comprises a bolt capable of immobilizing the locking element in the locking configuration and preventing the latter adopting the release configuration under the action of the impeller unless a male assembly is in abutment with and locked by said bolt 81 to said female assembly.

18. The device according to claim 17, wherein the locking rod comprises a portion having a smaller cross-section cooperating with a head of the bolt that enters or rotates in the channel at the site of the smaller cross-section in order to be able to immobilize the bolt in position or conversely, allow it to slide the bolt said channel.

* * * * *